(12) United States Patent
Yamashita et al.

(10) Patent No.: US 7,855,247 B2
(45) Date of Patent: Dec. 21, 2010

(54) PARTICLE DISPERSED RESIN COMPOSITION AND PROCESS FOR PRODUCING THE SAME

(75) Inventors: Takehiko Yamashita, Hyogo (JP); Takao Hisazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 11/917,381

(22) PCT Filed: Jun. 9, 2006

(86) PCT No.: PCT/JP2006/311612

§ 371 (c)(1),
(2), (4) Date: Dec. 13, 2007

(87) PCT Pub. No.: WO2006/134838

PCT Pub. Date: Dec. 21, 2006

(65) Prior Publication Data

US 2008/0221278 A1    Sep. 11, 2008

(30) Foreign Application Priority Data

Jun. 13, 2005    (JP)    ............................ 2005-171888

(51) Int. Cl.
*C08K 3/34* (2006.01)
*C08G 63/08* (2006.01)

(52) U.S. Cl. ...................................... 524/444; 525/450

(58) Field of Classification Search ................... 524/444
See application file for complete search history.

(56) References Cited

FOREIGN PATENT DOCUMENTS

| JP | 45-20775 | * | 7/1970 |
|----|----------|---|--------|
| JP | 60-013818 |  | 1/1985 |
| JP | 64-029433 |  | 1/1989 |
| JP | 64-29433 | * | 1/1989 |
| JP | 3-028800 |  | 2/1991 |
| JP | 9-124836 |  | 5/1997 |
| JP | 11-199762 |  | 7/1999 |
| JP | 2004-175865 |  | 6/2004 |
| JP | 2004-182824 |  | 7/2004 |
| JP | 2004182824 A | * | 7/2004 |

OTHER PUBLICATIONS

Translation of JP 2004182824, Jul. 2004.*
Translation of JP 45-20775, Jul. 15, 1970.*
Translation of JP 64-29433, Jan. 31, 1989.*

* cited by examiner

*Primary Examiner*—Ling-Siu Choi
*Assistant Examiner*—Hui Chin
(74) *Attorney, Agent, or Firm*—McDermott Will & Emery LLP

(57) ABSTRACT

A particle dispersed resin composition (19) is a composition in which a particle dispersed solvent (17) with and in which functional particulate powder is mixed and dispersed is mixed with a heated and melted resin (16). The amount of the resin (16) is set at a capable amount thereof which the resin (16) impregnates.

8 Claims, 4 Drawing Sheets

10 μm

10 μm

US 7,855,247 B2

PARTICLE DISPERSED RESIN COMPOSITION AND PROCESS FOR PRODUCING THE SAME

RELATED APPLICATIONS

This application is the U.S. National Phase under 35 U.S.C. §371 of International Application No. PCT/JP2006/311612, filed on Jun. 9, 2006, which in turn claims the benefit of Japanese Application No. 2005-171888, filed on Jun. 13, 2005, the disclosures of which Applications are incorporated by reference herein.

TECHNICAL FIELD

The present invention relates to a resin composition and a process for producing it.

BACKGROUND ART

Conventionally, various kinds of particle dispersed resin compositions have been proposed of which resin characteristics are improved by mixing functional particulate powder with a resin. For example, there have been proposed flame retardant resin compositions with and in which flame retardant particulate powder is mixed and dispersed in a thermoplastic resin, such as high impact polystyrene or the like. Besides, there have been proposed various kinds of particle dispersed resin compositions, such as a heat-resistant anti-aging polyamide resin composition with and in which potassium iodide particulate powder or the like is mixed and dispersed (see Patent Document 1, for example), a low stress transparent resin composition with and in which silica based particulate powder is mixed and dispersed, a high strength resin composition with and in which particulate powder of a metal-containing oxide compound is mixed and dispersed, a magnetic resin composition, such as magnetic toner with and in which magnetic particulate powder is mixed and dispersed, and the like.

Such particulate powder will, however, cohere (secondarily) to form agglomerates in general. For this reason, even if such particulate powder is added to and mixed with a resin, the particulate powder, of which grain diameter is comparatively small, cannot be dispersed uniformly in the entire resin.

The cohesiveness of particulate powder correlates to the grain diameter of the particulate powder. Specifically, as the grain diameter of particulate powder is small, the cohesiveness thereof tends to increase. For example, particulate powder of which grain diameter is 1 μm or smaller exhibits especially high cohesiveness, and therefore, it is difficult to obtaining a resin composition with and in which such particulate powder having a diameter of 1 μn or smaller is mixed and dispersed uniformly.

In view of the foregoing problems, various kinds of methods for mixing and dispersing particulate powder uniformly with and in a resin have been proposed. For example, Patent Document 1 proposes a method of obtaining a particle dispersed resin composition in which a fluid dispersion obtained by dissolving or dispersing a solid additive (particulate powder) in a solvent is added to a thermoplastic resin in a melted state, the resultant resin is kneaded, and then, the solvent is volatilized. Patent Document 1 discloses that according to this method, secondary cohesion of the particulate powder is suppressed, so that a resin composition can be obtained in which particulate powder of which grain diameter is small is mixed and dispersed comparatively uniformly.

Patent Document 1: Japanese Patent Application laid open unexamined Publication No. 64-29433

MEANS FOR SOLVING THE PROBLEMS

In the method disclosed in Patent Document 1, however, too much amount of the solvent are added to the melted resin. Specifically, there is disclosure that a fluid dispersion of 1.0 to 10.0 Phr is added to nylon 12 supplied at 30 kg/hr, for example. Addition of much amount of fluid dispersion to the melted resin causes difficulty in mixing the fluid dispersion with the resin sufficiently uniformly even by kneading. In an extreme case, the resin and the fluid dispersion would be discharged from a kneader separately. Accordingly, it is difficult to obtain a sufficiently homogenous particle dispersed resin composition.

The present invention has been made in view of the foregoing and has its object of providing a resin composition with and in which particulate powder is mixed and dispersed highly uniformly and a process for producing it.

SUMMARY OF THE INVENTION

To attain the above object, the present invention has a significant feature that the amount of a particle dispersed solvent mixed with a thermally melted resin is set equal to or smaller than a capable maximum amount thereof which the thermally melted resin impregnates.

Specifically, a resin composition in accordance with the present invention has a feature that a particle dispersed solvent with and in which functional particulate powder is mixed and dispersed is mixed with a heated and melted resin by a capable amount thereof which the resin impregnates.

A resin composition producing process in accordance with the present invention is a process for producing a resin composition containing a resin with and in which functional particulate powder is mixed and dispersed, wherein a particle dispersed solvent obtained by mixing and dispersing the functional particulate powder with and in a solvent is mixed with a heated and melted resin by a capable maximum or smaller amount thereof which the resin impregnates.

BEST MODE FOR CARRYING OUT THE INVENTION

An embodiment of the present invention will be described below in detail with reference to the accompanying drawings.

Figure 1:
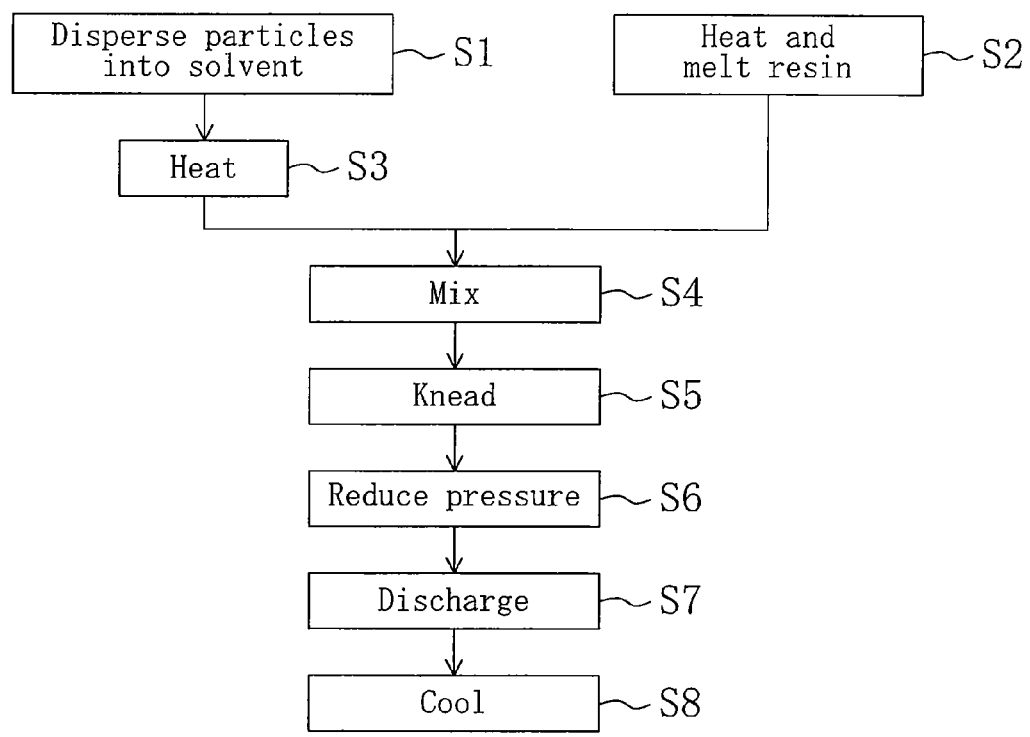
FIG. 1 is a flowchart depicting steps for producing a flame retardant resin composition.

FIG. 1 is a flowchart depicting steps for producing a particle dispersed resin composition.

First of all, a single or plural kinds of functional particulate powders are dispersed in a solvent to prepare a particle dispersed solvent (Step 1). Specifically, for example, the functional particulate powder is dispersed in an excessive amount of the solvent once, and then, the solvent is volatilized by a rotary evaporator or the like for condensation to thus prepare the particle dispersed solvent in which a desired amount of the particulate powder is dispersed. Particularly, in the case where a particle dispersed solvent with a comparatively high density (50% or higher weight ratio of the particulate powder to the solvent, for example) is prepared, the above preparation easily attains a particle dispersed solvent in which the particle is more uniformly dispersed.

The functional particulate powder is dispersed for the purpose of enhancing and/or maintaining the characteristics of the resin. The kind of the functional particulate powder can be determined appropriately according to a characteristic of the resin to be enhanced. The functional particulate powder may be, for example, any particulate powder of a flame retarder, a flame retardant assistant, a releasing agent, a lubricant, an impact strength modifier, a plasticizer, a fluid modifier, a conductive material, an antistatic agent, a hardening agent, an anti-oxidizing agent, a coloring agent, a stabilizing agent, and the like. More specifically, for providing a flame retardant property to the resin, flame retardant particulate powder of $SiO_2/MgO$, $Fe(acac)_3$, $Cu(acac)_2$, or the like or flame retardant particulate powder of bisphenol A or phenyl ether may be mixed and dispersed.

The grain diameter of the functional particulate powder is preferably 1 μm or smaller. With the functional particulate powder having such a grain diameter, the surface area of the functional particulate powder increases, thereby providing a further excellent property to the resin. The functional particulate powder having such a diameter can be obtained by crushing a material having a comparatively large diameter of 5 to 10 μm by a ball mill or the like, for example.

The solvent for allowing the functional particulate powder to be dispersed can be determined appropriately according to the resin or the functional particulate powder used. For example, a glycol solvent, a glycol ether solvent, an alcohol solvent, a ketone solvent, a mixed solvent of any of them, or the like may be used. Further, any kind of additive, such as an antibacterial agent, a fungi-proof agent, an anti-oxidizing agent, an insect repellent, a surfactant, a coloring agent, a foaming agent, a fluid accelerating agent, or the like may be added to any of the above solvents according to needs.

Preferably, the solvent has low capability of dissolving the resin. More preferably, the solvent does not allow the resin to be dissolved therein substantially. The solvent having the low capability includes a glycol solvent and a glycol ether solvent. With the use of the solvent having the low capability, such as a glycol solvent, a glycol ether solvent, or the like, the resin and the particle dispersed solvent can be mixed with each other highly uniformly in the later steps (Steps 4 and 5).

Specifically, the glycol solvent includes an ethylene glycol solvent, a diethylene glycol solvent, a propylene glycol solvent, a dipropylene glycol solvent, and the like. The glycol ether solvent includes a diethylene glycol methyl ether solvent, a diethylene glycol ethyl ether solvent, a diethylene glycol propyl ether solvent, a diethylene glycol butyl ether solvent, a triethylene glycol methyl ether solvent, a triethylene glycol ethyl ether solvent, a triethylene glycol propyl ether solvent, a triethylene glycol butyl ether solvent, a tripropylene glycol methyl ether solvent, a tripropylene glycol ethyl ether solvent, a tripropylene glycol propyl ether solvent, a tripropylene glycol butyl ether solvent, and the like.

Further, the solvent preferably has a property of allowing the resin to swell. In other words, it is preferable that the solvent is impregnated readily in the resin. Herein, the term, "swelling" means a property of absorbing a solvent to expand.

For example, the above mentioned glycol and glycol ether solvents has a property of swelling high impact polystyrene resin and polylactide resin. The high impact polystyrene resin and the polylactide resin are less dissolved in the glycol solvents and the glycol ether solvents. For this reason, in a case using the high impact polystyrene resin or the polylactide resin, it is preferable to use the above mentioned glycol or glycol ether solvent.

The density of the functional particulate powder dispersed in the solvent can be determined appropriately according to a desired characteristic of the particle dispersed resin composition. For example, the density of the functional particulate powder in the solvent may be 50 wt %.

In parallel to or after Step 1, the resin is heated and melted (Step 2). Referring to the resin, not only generally-called virgin resin first produced from a material but also waste resin or mill ends generated in the producing steps, reworked materials reproduced from wasted electric appliance recovered from the market, or the like may be used.

Further, the resin is not limited specifically and may be selected appropriately according to needs. The resin may be thermoplastic resin or thermosetting resin. For example, in order to produce a flame retardant resin composition, it is preferable to use styrene based resin or eco-friendly resin. The styrene based resin includes polystyrene, high impact polystyrene, styrene-butadiene-acrylonitrile, styrene-butadiene, poly-α-methyl styrene, styrene-acrylonitrile, styrene-maleic anhydride, and the like. The eco-friendly resin in the present specification is a generic term of biodegradable resins including petroleum-derived resins and plant-derived resins and plant-derived resins having no biodegradability. Specifically, the eco-friendly resin includes polylactide based resin (PLA), polybutylene succinate based resin (PBS based resin: a copolymer resin of 1.4-butanediol and saccinate), polyethylene terephthalate (PET) based resin, and the like.

The resin used herein may be a single kind of resin or a blended resin of plural kinds of resins. The molecular weight thereof is preferably in a range between approximately 3,000 and 1,000,000, for example.

Figure 2:
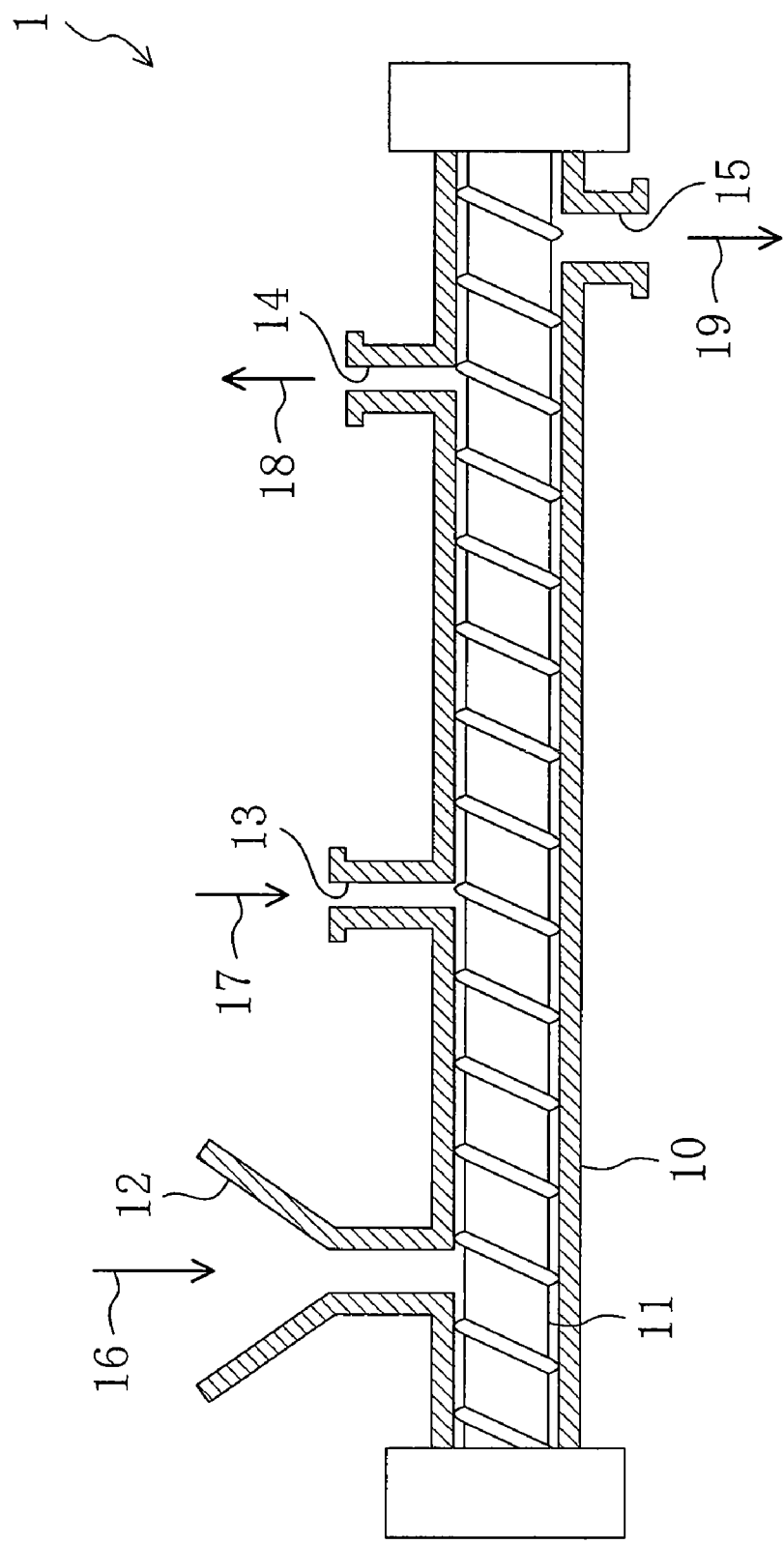
FIG. 2 is a schematic sectional view of a production apparatus 1.

Heating and melting of the resin (Step 2) is performed in a production apparatus 1 shown in FIG. 2.

The production apparatus 1 includes a cylindrical main body 10 and a screw set 1 provided in a pipe of the main body 10. The screw set 11 includes a single screw or a plurality of screws rotatable about the longitudinal axis of the main body 10. Namely, the production apparatus 1 is a kneader extruder of single axis or plural axes (for example, two axes) type. It is noted that the L/D of the production apparatus 1 is preferably in the range between 7.5 and 30, both inclusive. The larger the L/D is, the more easily the resin and the particle dispersed solvent can be kneaded highly uniformly. In contrast, the smaller the L/D is, the more the cost of the production apparatus 1 reduces.

A resin injection port 12 is formed in the main body 10 for injecting a resin 16 into the pipe. Specifically, the resin injection port 12 is formed upstream in the traveling direction of the to-be-kneaded resin 16 (left in FIG. 2) so as to communicate with the inside of the main body 10. The resin 16 is injected from this resin injection port 12. The resin 16 is injected under pressure into the main body 10 by a gear pump (not shown) or the like. It is noted that the form of the resin 16 to be injected is not limited specifically. The resin 16 to be injected may be in the form of powder, pellet, or tablet.

The resin 16 injected under pressure is heated and melted (Step 2) while being pushed forward in the axial direction (rightward in FIG. 2) by the rotation of the screw set 11. A heater (not shown) provided in the production apparatus 1 heats and melts the resin 16. The temperature for heating the resin 16 depends on the kind of the resin 16 and is preferably set within the range between approximately 50° C. and 300° C., both inclusive (more preferably, between 100° C. and 200° C., both inclusive). For example, for melting high impact polystyrene resin, the temperature is preferably set at approximately 180° C.

On the downstream side in the traveling direction (right in FIG. 2) of the resin injection port 12, a solvent injection port 13 is formed for injecting a particle dispersed solvent 17 prepared in Step 1. Though the solvent injection port 13 and the resin injection port 12 are formed separately in the present embodiment, both the particle dispersed solvent 17 and the resin 16 may be injected through the resin injection port 12. In other words, the resin injection port 12 may function as a solvent injection port in addition.

The particle dispersed solvent 17 prepared in Step 1 is injected into the main body 10 through the solvent injection port 13. Prior to injection thereof into the main body 10, the particle dispersed solvent 17 to be injected is preferably heated at a temperature substantially equal to that of the resin 16 heated and melted in the main body 10 (Step 3). This suppresses lowering in temperature of the resin 16 in injecting the particle dispersed solvent 17. As a result, the particle dispersed solvent 17 and the resin 16 are mixed with each other more uniformly.

The amount of the injected particle dispersed solvent 17 is preferably set equal to or smaller than a capable maximum value thereof which the resin 16 impregnates. This permits the resin 16 and the particle dispersed solvent 17 to be mixed with each other highly uniformly. Accordingly, a particle dispersed resin composition in which the functional particulate powder is highly uniformly mixed and dispersed can be obtained. In contrast, when the amount of the injected particle dispersed solvent 17 is larger than the capable maximum value thereof which the resin 16 impregnates, it is difficult to knead the resin 16 and the particle dispersed solvent 17 sufficiently uniformly. In an extreme case, the resin 16 and the particle dispersed solvent 17 are separated yet even after kneaded. For this reason, it is difficult to obtain a particle dispersed resin composition in which the functional particulate powder is mixed and dispersed sufficiently uniformly.

The injected particle dispersed solvent 17 of which amount is equal to or smaller than the capable maximum value thereof which the resin 16 impregnates suppresses particle loss (a phenomenon that particulate powder to be mixed with a resin composition is not mixed with and dispersed in the resultant resin composition), which is accompanied by excessive solvent outflow. In other words, almost all amount of the particulate powder in the mixed particle dispersed solvent 17 is mixed with and dispersed in the resultant particle dispersed resin composition 19. Accordingly, a particle dispersed resin composition 19 having a desired mixing ratio (a mixing ratio of the particulate powder to the resin 16) can be produced easily. In other words, the mixing ratio of the particulate powder in the particle dispersed resin composition 19 can be controlled easily.

Preferably, the particle dispersed solvent 17 is a glycol solvent, a glycol ether solvent, or a mixed solvent of a glycol solvent and a glycol ether solvent, in which the functional particulate powder is dispersed. In general, resin is less dissolved into the glycol solvent and the glycol ether solvent. With the use of the glycol solvent and/or the glycol ether solvent, the resin 16 and the particle dispersed solvent 17 can be mixed with each other highly uniformly. The glycol solvent and the glycol ether solvent are impregnated readily in, for example, high impact polystyrene resin and the like. For this reason, in a case using a high impact polystyrene resin or the like as the resin 16, it is preferable that the particle dispersed solvent 17 contains the glycol solvent, the glycol ether solvent, or a mixed solvent thereof. A combination of a resin and such a solvent attains a particle dispersed resin composition in which the functional particulate powder is mixed and dispersed highly uniformly.

The particle dispersed solvent 17 and the resin 16 thus injected are kneaded by the screw set 11 while being pushed in the traveling direction (from left to right in FIG. 2) (Step 5).

On the downstream side (right in FIG. 2) in the traveling direction of the injection port 13, a suction port 14 open to the inside of the main body 10 is formed. The suction port 14 is connected to pressure reducing means (not shown), such as a pump or the like. When the pressure reducing means (not shown) is driven for pressure reduction by sucking the inside of the main body 10 through the suction port 14, the solvent 18 contained in the resin composition is reduced in amount (Step 6). Step 6 attains a particle dispersed resin composition 19 having a low solvent content.

In Step 6, the removed solvent is cooled and liquefied to be recovered. The recovered solvent is reusable. By so doing, the solvent use efficiency increases to reduce the production cost of the particle dispersed resin composition 19.

Thereafter, the kneaded particle dispersed resin composition 19 is discharged through a discharge port 15 formed at the end part opposite the end part in which the resin injection port 12 is formed (Step 7). Specifically, the particle dispersed resin composition 19 is discharged linearly into, for example, water to be cooled (Step 8). Then, the particle dispersed resin composition 19 is cut into a desired length by cutting means (a pelletizer or the like (not shown)) to thus obtain a pellet-shaped particle dispersed resin composition 19.

The capable maximum amount of the solvent which the resin 16 impregnates can be obtained with the use of the production apparatus shown in FIG. 2.

Figure 3:
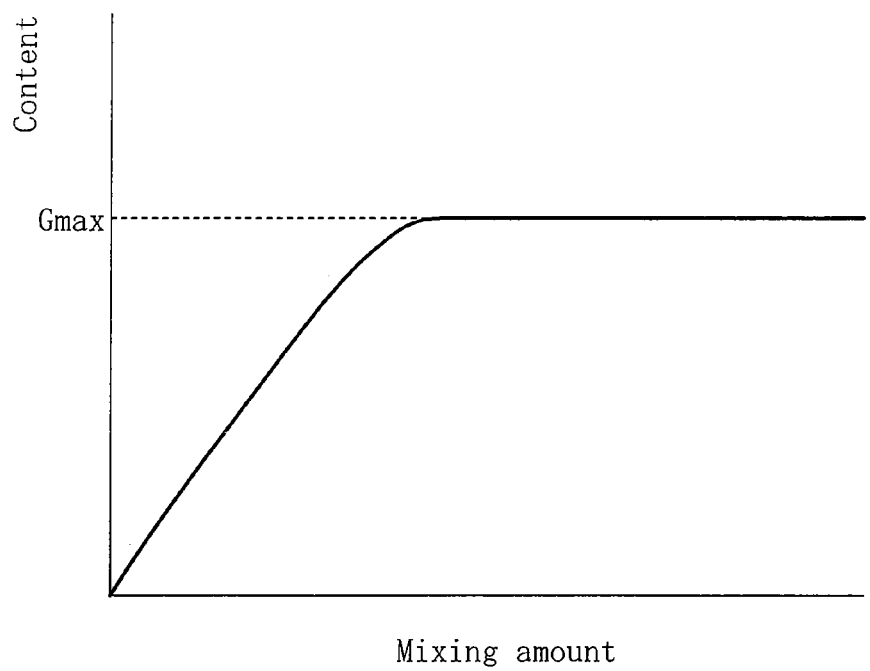
FIG. 3 is a graph schematically showing a correlation between the mixing amount per unit weight of a solvent mixed with a resin and the solvent content per unit weight of the resin.

Similarly to the case for producing a particle dispersed resin composition, a resin is injected through the resin injection port 12 and is heated and melted by the production apparatus 1. A solvent is injected into the heated and melted resin through the solvent injection port 13. The resin and the solvent thus injected are kneaded and are then discharged through the discharge port 15. In this measurement, the suction port 14 is closed so as not to reduce the amount of the solvent by pressure reduction by suction. Finally, the solvent content per unit weight of the discharged resin is measured FIG. 3 is a graph schematically showing the correlation between the mixing amount per unit weight of the solvent mixed with the resin and the solvent content per unit weight of the resin.

In the range where the mixing amount of the solvent is small, the solvent content per unit weight of the discharged resin increases as the amount of the injected solvent is increased. When the mixing amount of the solvent exceeds a given amount, however, no change in solvent content per unit weight of the resin is observed (the content becomes constant) even when the amount of the injected solvent is increased. Namely, the solvent is saturated.

In the present specification, the maximum value (Gmax) of the thus measured solvent content per unit weight of the resin is called the capable maximum value of the solvent which the resin 16 impregnates.

The solvent content can be calculated by comparing the weight of the obtained resin and the weight of the resin after crashed and dried under reduced pressure.

By performing the above producing steps, (secondary) cohesion of the functional particulate powder can be suppressed. Accordingly, a particle dispersed resin composition is obtainable which includes no comparatively large agglomerate and which includes the functional particulate powder having comparatively small grain diameter and mixed and dispersed highly uniformly. For example, when functional particulate powder of which average grain diameter is 1 μm or smaller is used, the resultant functional particulate powder (and agglomerates thereof) contained in the resultant particle dispersed resin composition has an average grain diameter of 10 μm or smaller. In consequence, a particle dispersed resin composition exhibiting a high function can be obtained.

A particle dispersed resin composition produced with the use of the glycol solvent and/or the glycol ether solvent contains at least a slight amount of glycol and/or glycol ether. The particle dispersed resin composition containing glycol and/or glycol ether of such an amount can be produced easily by the above described method. Hence, the aspect can be realized which the functional particulate powder of which (secondary) cohesion is suppressed is mixed and dispersed highly uniformly.

Preferably, the resin contained in the particle dispersed resin composition has swelling property. If so, the aspect that the functional particulate powder is mixed and dispersed highly uniformly can be realized easily. In the present specification, the "swelling property" means a property allowing a resin of 1 kg to impregnate a solvent of 50 g or more.

Referring to the "average grain diameter," in the present specification, a first resin composition in accordance with the present invention may include two or more kinds of functional particulate powder, wherein at least one kind of functional particulate powder has an average grain diameter of 10 μm or smaller. Namely, functional particulate powder of which average grain diameter is 10 μm or smaller and another kind of functional particulate powder of which average grain diameter is larger than 10 μm, for example, may be mixed with and dispersed in the resin.

In the case, for example, where there are formed a region where a single kind of functional particulate powder having a grain diameter of 10 μm or smaller distributes and a region where the same kind of functional particulate powder having a grain diameter of larger than 10 μm distributes, the "average grain diameter" herein means an average diameter of only the functional particulate powder belonging to the distribution range where the grain diameter is 10 μm or smaller.

The "average grain diameter" can be measured by a laser scattering analysis using a grain size distribution measuring device (Microtrac MT3300 produced by NIKKISO CO., LTD.).

WORKING EXAMPLE

The particulate powder to be added was prepared from a micropowder, Fireless S manufactured by TRUST LIF CO., LTD. as a non-halogen based flame retarder. Fireless S micropowder was a porous polymer of alumina-silicate salt and sodium silicate. The average grain diameter of Fireless S micropowder was 5 μm. Fireless S micropowder of 10 weight parts and dipropylene glycol of 90 weight parts were mixed with each other and injected into a ball mill.

The size of the ball for mill was set at approximately 80%. A ball of zircon oxide ($ZrO_2$) having a ball diameter of 0.3 mmφ was used as the ball for mill. The surface of the mill was made of zircon oxide ($ZrO_2$) just the same as the material of the ball.

The ball mill was rotated for approximately 180 minutes at a circumferential speed of 12 m/S. The resultant particulate powder has an average grain diameter of approximately 0.1 μm.

A mixed solution of the thus obtained particulate powder and dipropylene glycol was heated and sucked by a rotary evaporator. The temperature in sucking was set at 180° C. Whereby, the weight ratio of the particulate powder to dipropylene glycol was set at 50 weight %.

The resin in a pellet shape was prepared by crushing a chassis resin of a scraped television and removing a flame retarder therefrom. The resin used was high impact polystyrene (HIPS). The average molecule weight thereof was approximately 40000.

A 50 φ kneader, S2KRC manufactured by KURIMOTO, LTD. was used as the kneader. The HIPS resin was injected into the kneader and was hated at 180° C. to be melted. The amount of the resin injected was 9.5 kg/h.

The particle dispersed solvent heated at 180° C. is injected into the melted HIPS resin by a gear pump. The amount of the injected particle dispersed solvent was 1 kg/h. In other words, the input amount of the particle dispersed solvent was approximately 10.5 weight % of the input amount of the resin. The HIPS resin can impregnate dipropylene glycol of up to 20%. Accordingly, the amount of the injected particle dispersed solvent in the present working example was equal to or smaller than the capable maximum value thereof which the HIPS resin impregnates. Actually, no separated dipropylene glycol was discharged.

The kneaded body of the particle dispersed solvent and the HIPS resin was reduced in pressure by suction by a vacuum pump manufactured by ULVAC Inc. to reduce the concentration of dipropylene glycol. Thereafter, the kneaded body was discharged into water from the kneader to obtain a linear particle dispersed rein composition. Then, the thus obtained linear particle dispersed resin composition was cut into a desired length to thus obtain a pellet-shaped particle dispersed resin composition.

The concentration of dipropylene glycol in the thus obtained particle dispersed resin composition was 0.1% or smaller. The concentration of dipropylene glycol was measured by gas chromatography using CG-2014 manufactured by Shimadzu Corporation. Specifically, the resin was dissolved in the normal amount of tetrahydrofuran (THF), and methanol was added thereto as a poor solvent to cause precipitation of the resin. Then, a skim solution obtained therefrom was analyzed by the gas chromatography. For reference, a solution of TFT to which the normal amount of dipropylene glycol is mixed was analyzed under the same conditions. The peak intensity of the sample was compared with that of the reference sample to calculate the amount of the detected dipropylene glycol, and then, the concentration of dipropylene glycol was calculated therefrom.

The compositions of the thus obtained particle dispersed resin composition were analyzed by an apparatus for micro thermogravimetry, TGA-50 manufactured by Shimadzu Corporation. Specifically, a predetermined weight of the particle dispersed resin composition was hated at 800° C. for removing by baking the resin, and the weight of the residue (particulate powder) was measured to measure the compositions of the particle dispersed resin composition. This resulted in that the HIPS was 95 weight % while the particulate powder was 5 weight %.

The obtained particle dispersed resin composition was shot for observation by a scanning electron microscope (SEM), SUPERSCAN SS-550 manufactured by Shimadzu Corporation.

Figure 4:
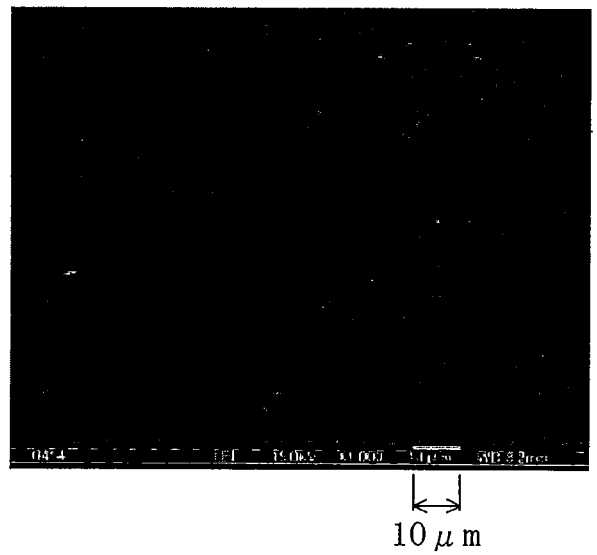
FIG. 4 is a SEM photo of a particle dispersed resin composition in accordance with Working Example.

FIG. 4 is a SEM photo of the particle dispersed resin composition in accordance with Working Example.

As shown in FIG. 4, the grain diameters of the particulate powder in the particle dispersed resin composition was 0.5 µm or smaller. Further, it is understood that the particulate powder is dispersed highly uniformly.

Measurement of various properties (Charpy impact strength, Dupont impact strength, and Vicat softening temperature) of the obtained particle dispersed resin composition revealed that the obtained composition was the same as the resin before kneaded in all the properties. Specifically, the Charpy impact strength is 18 KJ/m$^2$, Dupont impact strength was 11.22 j (110 kgf·cm), and the Vicat softening temperature was 90° C. The Charpy impact strength, the Dupont impact strength, and the Vicat softening temperature were measured by a Charpy impact tester of 30 kgf·m type manufactured by Shimadzu Corporation, a Dupont impact tester, NO. 451 manufactured by Toyo Seiki Seisaku-Sho, Ltd., and a HDT tester, NO. 533 manufactured by Toyo Seiki Seisaku-Sho, Ltd., respectively.

Further, after the resin contained in the particle dispersed resin composition was dissolved in THF (tetrahydrofuran), the molecule weight thereof was measured by a GPC, Shodex GPC-101 manufactured by Showa Denko K.K. The measured molecule weight of the resultant particle dispersed resin composition was 38500.

COMPARATIVE EXAMPLE

A particle dispersed resin composition was produced by the same method as in Working Example except that a non-crushed micropowder of Fireless S manufactured by TRUST LIF CO., LTD. was used as the added particulate powder. The resultant particle dispersed resin composition was shot for observation by a scanning electron microscope (SEM), SUPERSCAN SS-550 manufactured by Shimadzu Corporation.

Figure 5:
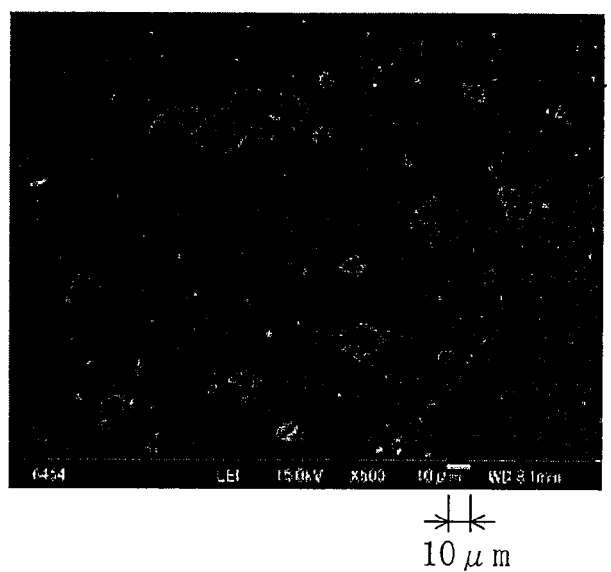
FIG. 5 is a SEM photo of a particle dispersed resin composition in accordance with Comparative Example.

FIG. 5 is a SEM photo of the particle dispersed resin composition in accordance with Comparative Example.

As shown in FIG. 5, large grains of approximately 100 µm were observed in the resin to find that the particulate powder is mixed insufficiently.

The present invention is applicable to general resin compositions in which particulate powder is dispersed, and is applicable to, for example, fire retardant resin compositions, heat-resistant anti-aging resin compositions, low stress transparent resin compositions, high strength resin compositions, magnetic resin compositions, and the like.

INDUSTRIAL APPLICABILITY

As described above, the resin composition producing method in accordance with the present invention attains a resin composition in which particulate powder is dispersed highly uniformly and is, therefore, useful in fire retardant resin compositions, heat-resistant anti-aging resin compositions, low stress transparent resin compositions, high strength resin compositions, magnetic resin compositions, and the like.

The invention claimed is:

1. A particle dispersed resin composition, wherein
   a particle dispersed solvent in which functional particulate powder is dispersed is mixed with a heated and melted resin,
   an amount of the particle dispersed solvent is 50 g or larger per 1 kg of the resin and equal to or less than a maximum amount which the resin is capable of impregnating,
   the functional particulate powder is dispersed in the resin without chemical bonding between the functional particulate powder and the resin, and
   the resin is a styrene based resin or a polylactide resin.

2. The particle dispersed resin composition of claim 1, wherein the solvent does not substantially allow the resin to be dissolved therein.

3. The particle dispersed resin composition of claim 1, wherein the solvent is a glycol solvent or a glycol ether solvent.

4. A process for producing a particle dispersed resin composition containing a resin in which functional particulate powder is dispersed, the process comprising steps of:
   mixing and dispersing the functional particulate powder with a solvent to obtain a particle dispersed solvent; and
   then, mixing a heated and melted resin with the particle dispersed solvent, wherein:
   an amount of the particle dispersed solvent is 50 g or larger per 1 kg of the resin and equal to or less than a maximum amount which the resin is capable of impregnating,
   the functional particulate powder is dispersed in the resin without chemical bonding between the functional particulate powder and the resin, and
   the resin is a styrene based resin or a polylactide resin.

5. The process of claim 4, wherein the solvent does not substantially allow the resin to be dissolved therein.

6. The process of claim 4, wherein the solvent is a glycol solvent or a glycol ether solvent.

7. The process of claim 4, wherein the particle dispersed solvent is reduced in pressure by suction after being mixed with the heated and melted resin.

8. The process of claim 4, wherein after the particle dispersed solvent is heated at a temperature substantially equal to a temperature of the heated and melted resin, the heated particle dispersed solvent is mixed with the heated and melted resin.

* * * * *